United States Patent
Weber

(10) Patent No.: US 9,394,960 B2
(45) Date of Patent: Jul. 19, 2016

(54) HYDROPNEUMATIC PISTON/CYLINDER ARRANGEMENT

(75) Inventor: Norbert Weber, Sulzbach/Saar (DE)

(73) Assignee: HYDAC TECHNOLOGY GMBH, Sulzbach/Saar (DE)

( * ) Notice: Subject to any disclaimer, the term of this patent is extended or adjusted under 35 U.S.C. 154(b) by 109 days.

(21) Appl. No.: 13/261,701

(22) PCT Filed: Dec. 8, 2011

(86) PCT No.: PCT/EP2011/006169
§ 371 (c)(1),
(2), (4) Date: Sep. 9, 2013

(87) PCT Pub. No.: WO2012/103909
PCT Pub. Date: Aug. 9, 2012

(65) Prior Publication Data
US 2013/0341842 A1 Dec. 26, 2013

(30) Foreign Application Priority Data
Feb. 1, 2011 (DE) .......................... 10 2011 010 070

(51) Int. Cl.
*F16F 9/06* (2006.01)

(52) U.S. Cl.
CPC ................. *F16F 9/061* (2013.01); *F16F 9/067* (2013.01)

(58) Field of Classification Search
CPC ............ F16F 9/34; F16F 9/348; F16F 9/344; F16F 9/3481; F16F 9/3482; F16F 9/06; F16F 9/061

USPC ............ 188/313, 316, 317, 269, 283, 322.15, 188/322.22, 322.14, 322.13
See application file for complete search history.

(56) References Cited

U.S. PATENT DOCUMENTS

| | | | |
|---|---|---|---|
| 3,316,558 A | | 5/1967 | Mortensen |
| 3,756,357 A | * | 9/1973 | Graff ...................... F16F 9/341 137/513.3 |
| 3,762,514 A | * | 10/1973 | Freitag .......................... 188/300 |
| 3,817,566 A | | 6/1974 | Keijzer et al. |
| 4,401,196 A | * | 8/1983 | Grundei ..................... 188/282.6 |
| 4,711,435 A | * | 12/1987 | Harris et al. ............. 188/322.13 |
| 5,913,391 A | * | 6/1999 | Jeffries et al. ................. 188/317 |
| 7,374,028 B2 | * | 5/2008 | Fox .......................... 188/322.14 |

FOREIGN PATENT DOCUMENTS

| | | | |
|---|---|---|---|
| BE | 655817 A | * | 3/1965 |
| DE | 2 024 749 | | 12/1971 |
| DE | 25 51 516 A1 | | 5/1977 |
| DE | 34 39 793 A1 | | 4/1986 |

(Continued)

*Primary Examiner* — Melanie Torres Williams
(74) *Attorney, Agent, or Firm* — Wenderoth, Lind & Ponack, L.L.P.

(57) ABSTRACT

A hydropneumatic piston/cylinder arrangement, in particular for use as a spring element and/or shock absorber element, includes a cylinder (1) and a piston (15) axially movable in the cylinder chamber (5) of the cylinder. The cylinder chamber is filled with hydraulic fluid. The piston (15) is connected to a piston rod (13) extending outwardly in a sealed manner from one end of the cylinder (1). The base of the piston remote from the piston rod (13) can be operatively connected to a pneumatic spring mechanism (7) to convey fluid. A piston accumulator (7) has an accumulator piston (19) directly adjoining the hydraulic fluid in the cylinder chamber provided as the spring mechanism.

13 Claims, 2 Drawing Sheets

(56) References Cited

FOREIGN PATENT DOCUMENTS

| | | |
|---|---|---|
| DE | 35 12 232 A1 | 8/1986 |
| DE | 38 40 352 A1 | 6/1990 |
| DE | 3 913 912 A1 | 10/1990 |
| DE | 697 14 237 T2 | 6/2004 |
| EP | 0 884 499 A1 | 12/1998 |
| FR | 2 331 718 A1 | 6/1977 |
| JP | 2006070950 A | 3/2006 |

* cited by examiner

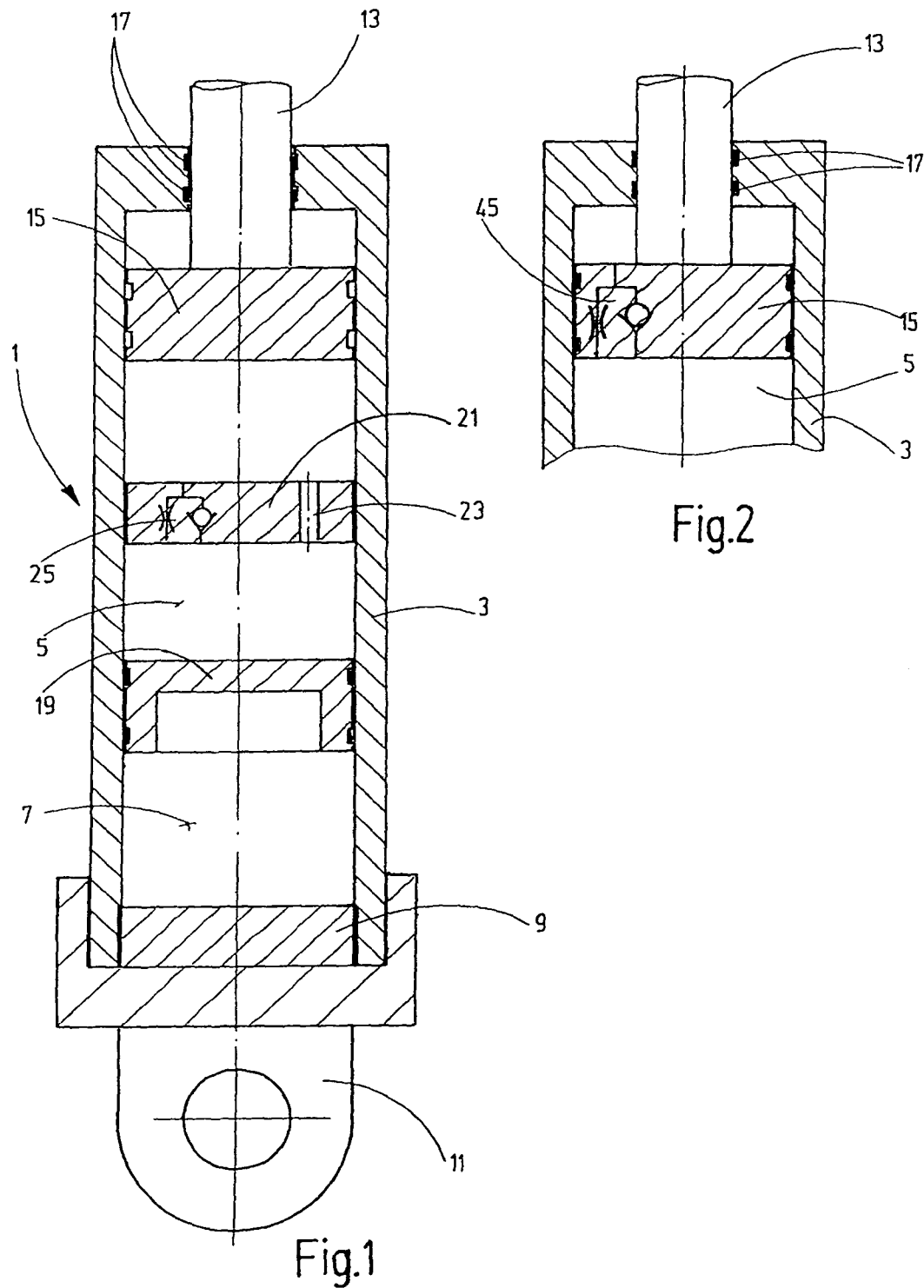

HYDROPNEUMATIC PISTON/CYLINDER ARRANGEMENT

FIELD OF THE INVENTION

The invention relates to a hydropneumatic piston/cylinder arrangement, in particular for use as a spring element and/or as a shock absorber element, comprising a cylinder and a piston. The piston is axially movable in the cylinder chamber of the cylinder. The cylinder chamber is filled with hydraulic fluid. The piston is connected to a sealed piston rod extending outwardly from one end of the cylinder. The base of the piston facing away from the piston rod can be brought into fluid-conducting operative connection with a pneumatic spring mechanism.

BACKGROUND OF THE INVENTION

Such hydropneumatic piston/cylinder arrangements are known; see, for example, Japanese Patent Publication 2006070950A. Such piston/cylinder arrangements may be used for various applications, for example, in vehicles, in particular in commercial vehicles, for the axle suspension, or in general technology as vibration dampers or shock absorbers or the like. A compact design of the piston/cylinder arrangement is essential for many applications, in particular for mobile use, e.g., as a spring leg. Known approaches, such as that disclosed in DE 35 12 232 A1, are not suitable for all applications. This application describes a hydropneumatic axle suspension for vehicles, i.e., for mobile use, but preferably for truck-mounted and mobile cranes, i.e., for heavy vehicles. The chassis of those vehicles is supported by hydraulic cylinders on their axles that are suspended on the frame. The hydraulic cylinders here are connected by hydraulic lines and cutoff valves to hydraulic gas or spring mechanisms arranged externally outside of the respective hydraulic cylinder and are connected to inlet and outlet lines for the hydraulic fluid by way of filling and drain valves. Due to the external gas or spring mechanisms plus the respective control system, the required installation space is accordingly high, and the response of the suspension is subject to a hysteresis and a time lag because of the long control distances via the aforementioned valves plus the inlet and outlet lines.

The known approach according to Japanese Publication 1006070950A, as cited in the introduction, overcomes these disadvantages by integrating the pneumatic spring mechanism in the cylinder in the form of a bladder mechanism. This approach is disadvantageous inasmuch as operational reliability is not ensured in long-term operation because the permeability of the material of the diaphragm of the bladder accumulator results in loss of gas from the bladder accumulator via diffusion. The measures described in the Japanese document to prevent gas diffusion by coating the diaphragm with an amorphous carbon layer are complex and do not offer absolute protection against gas diffusion through the membrane.

SUMMARY OF THE INVENTION

An object of the present invention is to provide an improved hydropneumatic piston/cylinder arrangement characterized by a high operational reliability in long-term operation despite its compact design.

According to the invention, this object is basically achieved by a hydropneumatic piston/cylinder arrangement having a piston element provided as the spring element. Its accumulator piston is directly adjacent to the hydraulic fluid in the cylinder chamber. When the piston accumulator is integrated into the cylinder, this arrangement eliminates the external components that take up installation space, such as those which are necessary in an external spring element. Also, the integrated piston accumulator yields a much greater operational reliability in comparison with a bladder accumulator, with regard to preventing gas diffusion through a diaphragm material and with regard to the greater mechanical sturdiness in comparison with an accumulator diaphragm.

In a particularly advantageous manner, the cylinder chamber for the hydraulic fluid and the chamber of the piston accumulator that is delimited on the gas side by the accumulator piston may be formed by a cylinder liner passing seamlessly from one end to the other. Therefore, the entire arrangement forms a compact and uniform component that is especially suitable for installation in devices with limited available space, for example, in a spring leg.

In especially advantageous exemplary embodiments, an intermediate body is arranged in an axially stationary manner between the accumulator piston and the piston connected to the piston rod. At least one fluid passage enables the provision of a predetermined flow in the cylinder chamber. The damping and shock absorber characteristics of the arrangement can be optimally adapted as needed through an appropriate design of the fluid passage and the corresponding size of the volume flows that are displaced with the movements of the piston connected to the piston rod through the fluid flow in the intermediate body.

The fluid passage in the intermediate body may be provided in the form of a through-hole dimensioned for the volume flows that are provided accordingly. Alternatively and preferably in addition to the through-hole, a fluid passage in the form of a throttle check valve may be provided in the intermediate body. This valve yields the possibility of designing the volume flows created with the piston movements to be different in one stroke direction and in the other stroke direction. Rapid damping in one stroke direction is then induced with a throttled reverse movement accordingly. This arrangement also dissipates vibration in the system.

A throttle check valve, having a valve plate with a borehole to form a throttling point, may be provided, especially advantageously, in the case of an installation space available to a limited extent in the axial direction inside the intermediate body. A functionally corresponding throttle check valve is known from DE 103 37 744 B3 per se.

The intermediate body may be provided in the form of a round plate that can be accommodated to fit in the cylinder and that is secured axially in the cylinder by at least one spring ring, for example.

For an additional throttle effect, independently of the piston connected to the piston rod in the tension direction and in the compression direction, a throttle check valve can be provided in the piston, permitting a limited fluid flow from the front side of the piston to the rear side of the piston adjacent to the piston rod, i.e., to a chamber closed on the cylinder end, i.e., to a closed chamber situated at the end of the cylinder from which the piston rod extends out of the cylinder with a seal.

Other objects, advantages and salient features of the present invention will become apparent from the following detailed description, which, taken in conjunction with the annexed drawings, discloses preferred embodiments of the present invention.

BRIEF DESCRIPTION OF THE DRAWINGS

Referring to the drawings that form a part of this disclosure:

FIG. 1 is a schematic and simplified side elevational view in section of a piston/cylinder arrangement according to a first exemplary embodiment of the invention;

FIG. 2 is a partial, side elevational view in section of only the end area on the fluid side of a piston/cylinder arrangement according to a second exemplary embodiment of the invention;

DETAILED DESCRIPTION OF THE INVENTION

Figure 3:
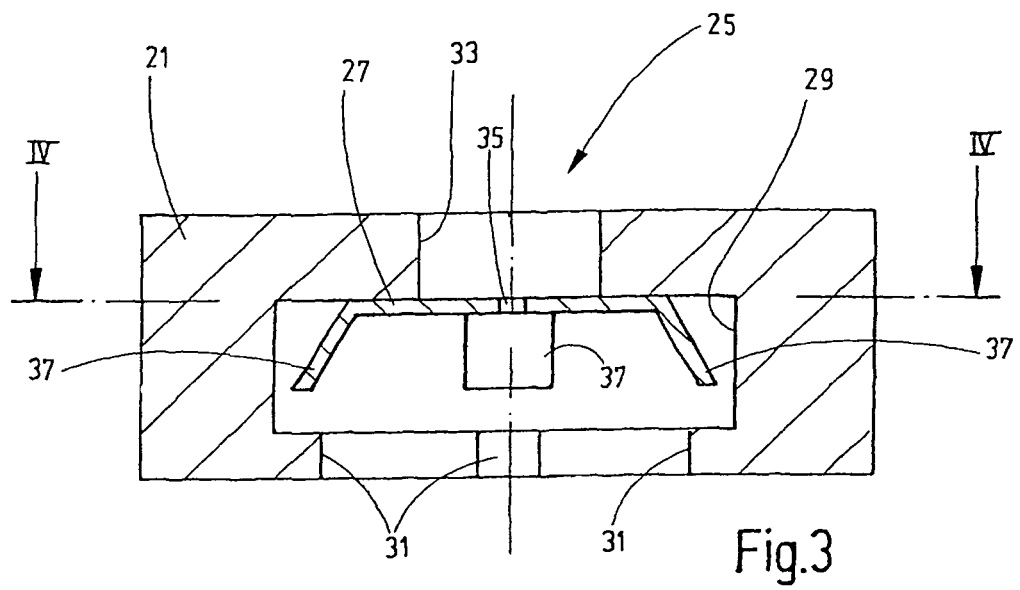
FIG. 3 is an enlarged, side elevational view in section showing only an intermediate body for use in the exemplary embodiments of FIG. 1 or FIG. 2.

In the exemplary embodiments shown in the drawings, the cylinder 1 is in the form of a cylinder liner 3 extending seamlessly from the cylinder chamber 5, forming the fluid side, to the spring accumulator 7 that is integrated into the cylinder liner 3. On the lower end in FIG. 1 belonging to the spring accumulator 7, the cylinder liner 3 is sealed by a closing plate 9 that is bolted or welded in place. A corresponding filling connection located in the closing plate 9 for filling the spring accumulator 7 with working gas (e.g., $N_2$) is not shown in the simplified diagram in FIG. 1. On the end having the closure cap 9, a fastening eye 11 is welded or bolted onto the cylinder liner 3. The piston rod 13 of a main piston 15 is movable in the cylinder chamber 5 on the fluid side and passes through the opposite closed upper end of the cylinder liner 3 with a fluid-tight seal formed by sealing elements 17. The spring accumulator 7 is formed on the piston accumulator that has an accumulator piston 19 in the form of a shallow pot open toward the accumulator 7 and provided as a movable separation element between the cylinder chamber 5 and the accumulator 7.

In an axial position adapted to the permissible stroke length of the piston 15 connected to the piston rod 19 in operation, an intermediate body 21 in the form of a flat circular plate fits the inside wall of the cylinder liner 3 circumferentially, is secured axially thereon, for example, by spring rings sitting in grooves (not shown in the drawing), and is situated inside the cylinder chamber 5 on the fluid side. Despite the extensive contact of the intermediate body 21 with the cylinder liner 3, the intermediate body 21 does not form a sealing dividing element for the fluid (hydraulic fluid) inside the cylinder chamber 5. Instead, intermediate body 21 is provided with devices that allow fluid to pass through it. These devices are designed so that volume flows of the desired extent are displaced through the flow devices with the stroke movements of the working piston 15. In the example in FIG. 1, a through-hole 23 having a diameter adapted to the use conditions is provided for this purpose. In FIG. 1, in addition to the through-hole 23, a throttle check valve 25 is disposed in the intermediate body 21, permitting a more throttled volume flow in one direction of flow than in the other direction of flow. Whereas both measures, namely the through-hole 23 and the throttle check valve 25, are provided in the intermediate body 21 in FIG. 1, the borehole 23 alone or the throttle check valve 25 alone could also form the fluid passage.

Figure 4:
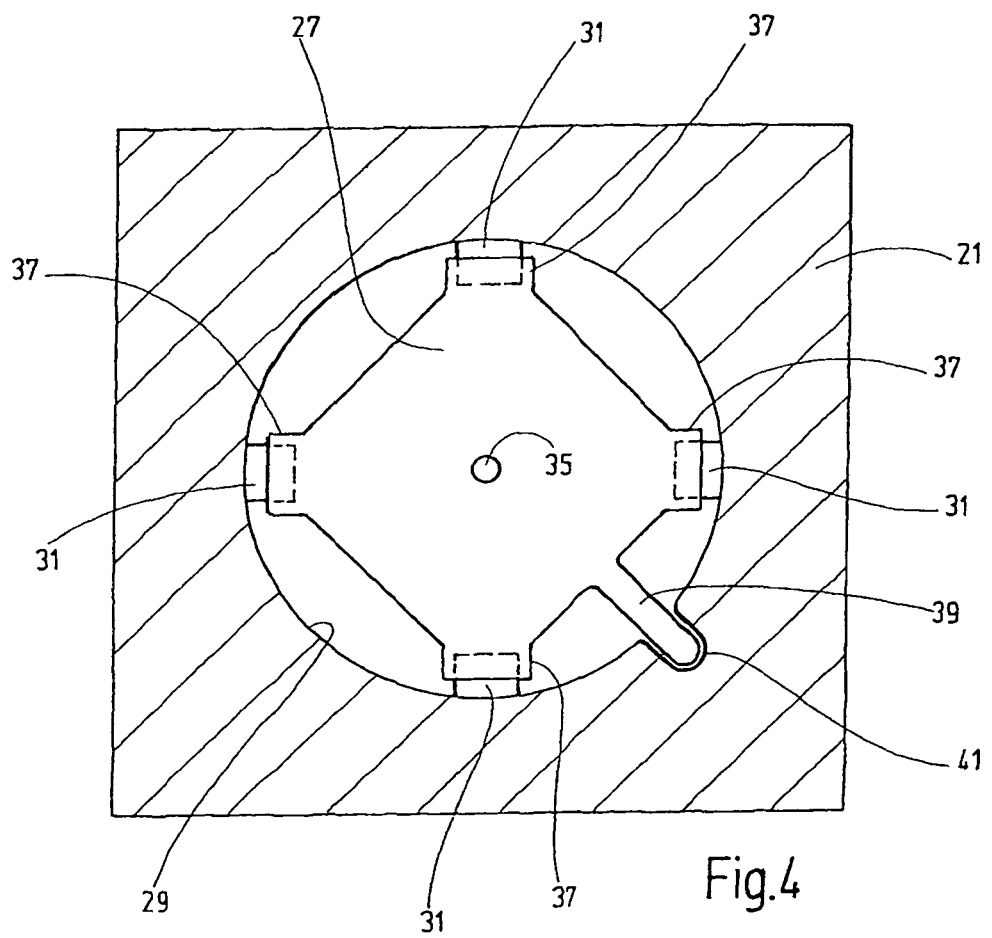
FIG. 4 is a top plan view in section through the intermediate body of FIG. 3 taken along line IV-IV in FIG. 3.

FIGS. 3 and 4 illustrate a possible design of the throttle check valve 25 in the form of a type of plate valve. With the chamber available in the axial direction inside the intermediate body 21, this valve design, as the one known principally from DE 103 37 744 B3, is especially suitable. As FIGS. 3 and 4 show, a valve plate 27 is in a valve housing 29 inside the intermediate body 21 and is provided as the movable valve body. This valve housing is open at the lower end in FIG. 3, apart from supporting bodies 31 protruding radially inward at the opening edge. On the opposite top side of the intermediate body 21, the valve housing 29 has a valve opening 33 that can be closed by the valve plate 27. Valve plate 27 is shown in its closed position in FIG. 3. In the closed position, the fluid passage through the valve bore 33 is blocked, apart from a throttled volume flow. The throttled volume flow is possible in the closed position through a throttle bore 35 provided in the central area of the valve plate 27.

The valve plate 27 in the example shown here has an essentially quadratic outline that describes a smaller area than that corresponding to the cross-section of the valve housing 29. When the valve plate 27 moves out of the closed position (downward in FIG. 3) and is no longer in sealing contact with the edge of the valve opening 33, the flow then passes around the valve plate 27 at the side. In the open position, a relatively large flow cross-section is then available. When the valve plate 27 is lifted away from the edge of the valve opening 33, the valve plate 27, with the base parts 37 that are bent obliquely outward at the corner areas, is supported on the supporting bodies 31. Other than the base parts 37 that are bent outward after insertion of the valve plate 27 into the valve housing 29, the valve plate 27 has a guide lug protrusion 39 (not shown in FIG. 3 for the sake of simplicity). Guide lug protrusion 39 can be bent for insertion into the valve housing 29 and can be brought into engagement with a guide groove 41 extending axially in the valve housing 29. Guide groove 41, together with the lug 39, forms a twist-proof lock for the valve plate 27.

In the example shown here, the valve plate 27 basically has a quadratic perimeter. It is self-evident that other shapes could also be possible, for example, a triangular shape or the like, on the condition that the outline of the plate is smaller than the opening cross-section of the valve housing 29. In the opened position, enough flow cross-section is then available at the edge of the valve plate.

FIG. 2 shows another variant. In this second exemplary embodiment, a throttle check valve 45 is also integrated in the piston 15 connected to the piston rod 13. An additional means is then available for an adjustment of the damping characteristics and/or spring characteristics to the use conditions.

While various embodiments have been chosen to illustrate the invention, it will be understood by those skilled in the art that various changes and modifications can be made therein without departing from the scope of the invention as defined in the appended claims.

What is claimed is:

1. A hydropneumatic piston/cylinder arrangement, comprising:

a cylinder having a cylinder chamber filled with hydraulic fluid;

a main piston axially movable in said cylinder chamber and having a base;

a sealed piston rod connected to said main piston and extending outward from one end of said cylinder, said base of said main piston facing away from said piston rod;

a pneumatic spring being in a fluid carrying operative connection with said base of said main piston, said pneumatic spring including a piston accumulator having an accumulator piston directly adjacent to said hydraulic fluid in said cylinder chamber; and an intermediate body being disposed in and axially stationary in said cylinder chamber between said main piston and said accumulator piston and having a fluid passage therein providing a predetermined fluid flow axially through said intermediate body, a throttle check valve being in said fluid passage in said intermediate body, said throttle check valve having a valve plate with a borehole forming a throttling point in said fluid passage, said borehole remaining open providing fluid communication through said borehole between portions of said cylinder chamber on opposite sides of said intermediate body in all positions of said valve plate.

2. A hydropneumatic piston/cylinder arrangement according to claim 1 wherein said cylinder chamber and a gas chamber for said accumulator piston on a gas side thereof are formed by a cylinder liner extending seamlessly between axial ends of said cylinder.

3. A hydropneumatic piston/cylinder arrangement according to claim 1 wherein said passage comprises a through-bore in said intermediate body.

4. A hydropneumatic piston/cylinder arrangement according to claim 1 wherein said intermediate body comprises a round plate fitting and accommodated in said cylinder, said round plate being secured axially in said cylinder by at least one spring ring.

5. A hydropneumatic piston/cylinder arrangement according to claim 1 wherein a throttle check valve is in said main piston and permits a limited fluid flow from a front side of said main piston to a rear side of said main piston.

6. A hydropneumatic piston/cylinder arrangement according to claim 1 wherein said valve plate has a radial cross section smaller than a portion of said fluid passage in which said valve plate is located and larger than a valve opening of said fluid passage adjacent said cylinder chamber.

7. A hydropneumatic piston/cylinder arrangement according to claim 6 wherein said valve plate is biased against said valve opening.

8. A hydropneumatic piston/cylinder arrangement, comprising:

a cylinder having a cylinder chamber filled with hydraulic fluid;

a main piston axially movable in said cylinder chamber and having a base;

a sealed piston rod connected to said main piston and extending outward from one end of said cylinder, said base of said main piston facing away from said piston rod;

a pneumatic spring being in a fluid carrying operative connection with said base of said main piston, said pneumatic spring including a piston accumulator having an accumulator piston directly adjacent to said hydraulic fluid in said cylinder chamber; and an intermediate body being disposed in and axially stationary in said cylinder chamber between said main piston and said accumulator piston and having a fluid passage therein providing a predetermined fluid flow axially through said intermediate body, a throttle check valve being in said fluid passage in said intermediate body, said throttle check valve having a valve plate with a borehole forming a throttling point in said fluid passage, said valve plate having a radial cross section smaller than a portion of said fluid passage in which said valve plate is located and larger than a valve opening of said fluid passage adjacent said cylinder chamber, said valve plate is biased against said valve opening, said intermediate body including supporting bodies extending radially inwardly into said fluid passage and being axially spaced from said valve opening, said valve plate having obliquely bent base parts supported on said supporting bodies and being located axially between said valve opening and said supporting bodies.

9. A hydropneumatic piston/cylinder arrangement according to claim 8 wherein said cylinder chamber and a gas chamber for said accumulator piston on a gas side thereof are formed by a cylinder liner extending seamlessly between axial ends of said cylinder.

10. A hydropneumatic piston/cylinder arrangement according to claim 8 wherein said passage comprises a through-bore in said intermediate body.

11. A hydropneumatic piston/cylinder arrangement according to claim 8 wherein said intermediate body comprises a round plate fitting and accommodated in said cylinder, said round plate being secured axially in said cylinder by at least one spring ring.

12. A hydropneumatic piston/cylinder arrangement according to claim 8 wherein a throttle check valve is in said main piston and permits a limited fluid flow from a front side of said main piston to a rear side of said main piston.

13. A hydropneumatic piston/cylinder arrangement according to claim 8 wherein said borehole remains open in all positions of said valve plate.

* * * * *